Sept. 7, 1965 H. HORTMEYER ETAL 3,205,115

APPARATUS FOR THE MOUNTING OF TRANSPARENCIES

Filed July 11, 1962 2 Sheets-Sheet 1

HEIKO HORTMEYER
CARL SCHRÖTER
INVENTORS

BY Mestern, Ross & Mestern

APPARATUS FOR THE MOUNTING OF TRANSPARENCIES

Filed July 11, 1962 2 Sheets-Sheet 2

HEIKO HORTMEYER
CARL SCHRÖTER
INVENTORS.

BY Mestern, Ross & Mestern

United States Patent Office 3,205,115
Patented Sept. 7, 1965

3,205,115
APPARATUS FOR THE MOUNTING OF TRANSPARENCIES

Heiko Hortmeyer, Wuppertal-Elberfeld, and Carl Schröter, Schmiden, Remstal, Germany, assignors to Firma Heinrich Hermann, Stuttgart-Wangen, Germany Filed July 11, 1962, Ser. No. 209,180
Claims priority, application Germany, July 18, 1961, H 43,157
10 Claims. (Cl. 156—479)

Our present invention relates to the mounting of transparencies and diapositives wherein a film section of one or more frames is provided with a mask, cover glasses and a frame securing the transparency between the glasses.

Heretofore the resulting slides have been produced by inserting the transparency in a slit within a mask and subsequently placing the mask loosely between the cover glasses. This method of mounting has the disadvantage that accurate registration and positioning of the transparency are difficult to accomplish. It is an object of the present invention to provide a method of and an apparatus for mounting transparencies for the production of projection slides wherein the film section is fixed between the cover glasses. Another object of the present invention is to provide an apparatus whereby the mounting of transparencies may be carried out simply and efficiently even by an unskilled operator.

According to a feature of the present invention the transparency is cemented to a surface of a mask in alignment with registration indicia adapted to afford proper positioning of the transparency within the finished slide. The mask and transparency are, thereafter, cemented to one of the transparent cover plates or glasses along this mask surface to prevent relative displacement of the glass and the transparency. A further transparent cover plate is then disposed over the mask and affixed to the first cover plate by a flexible frame of sheet material whose flaps bridge the edges of the two cover plates. Advantageously, the opaque mask, which has a window aligned with the transparency, is provided with a pressure-sensitive or thermally responsive adhesive so that an auxiliary source of cementitious material is avoided. A protective strip may be removed from the adhesive layer whereupon the transparency can be pressed against the mask in alignment with the aforementioned positioning indicia. Generally, the mask will be provided with a marginal portion of adhesive uncovered by the transparency when the latter is in place and adapted to join the mask and the transparency to the first cover plate.

According to a further feature of the invention the frame is also provided with a layer of pressure-sensitive adhesive from which the protective strip may be removed in order to permit the flaps thereof to be turned over the edges of the cover plates for securing them in place. The frame may, like the mask, be opaque and provided with a window aligned with the transparency.

According to another aspect of this invention we provide an apparatus for mounting transparencies wherein a base is provided with a main recess in which a generally planar support is displaceable transversely to itself. The frame, with its adhesive layer upwardly, is then disposed upon the support which carries a substantially flat plunger member projecting upwardly through an aperture within the frame. It will be understood that this aperture is aligned with the transparency to permit viewing thereof. The plunger is displaceable transversely to itself and in the direction of displacement of the support plate, i.e. downwardly. A guide device is disposed upon the base for positioning the first glass or cover plate upon the plunger member as well as for guiding the mask by which the transparency is affixed onto this plate. The second cover plate may likewise be positioned with the aid of this giude. Advantageously, the frame is provided with flaps which overlie the edges of the recess so that, upon depression of the plunger member, the lower or first glass plate is brought into contact with the adhesive surface of the frame and the flaps thereof are bent over to engage the edges of both plates. The device has the principal advantage that the guide means prevents relative shifting of the cover plates and the mask while the frame is being applied. It will thus be apparent that even an unskilled operator will be able to mount transparencies with a minimum of effort.

According to a further feature of the invention, the support plate is provided with an auxiliary recess within which the plunger member is displaceable, resilient means being provided between the plate and the member for exerting a force on the latter opposite to the direction of applied pressure. The support plate may be provided with a flexible layer partly overlying the aforementioned edges of the recess in the base so that, upon displacement of the support plate into this recess, the projecting portions of this layer are swung upwardly to apply the flaps of the frame to the edges of the glass plates. The receiving member may be provided with a central guide stud axially displaceable within a central sleeve or tubular portion of the support plate which in turn is slidably mounted in the base. Spring means with a stronger restoring force than the aforementioned resilient means are provided between the latter and the guide plate in order to bias this plate oppositely to the direction of applied pressure. To prevent breakage of the relatively thin transparent cover plates, stop means are provided for limiting the downward displacement of the plunger. Preferably, such displacement is halted when the receiving surface of the plunger is coplanar with or only slightly below that of the support plate. The receiving surface of the latter, which is formed with a flexible and, advantageously, resilient layer, is provided with a cushion of rubber (e.g. foam rubber) or resiliently deformable plastic adapted to prevent breakage of the cover plates. We have found it advisable to truncate the corners of the flexible receiving layer on the support plate to permit clean folding of the flaps.

According to a further feature of the invention, the guide means is formed as a bifurcated element which is pivoted to the base along its upper surface and has, at its fork ends, confronting angular cutouts adapted to receive a pair of diagonally opposite corners of the cover plates and mask. These ends are, advantageously, also provided with projections extending into the aforementioned recess so as positively to align the cutouts with the support plate. The confronting cutouts preferably lie along a diagonal of the slide which extends generally parallel to the pivotal axis of the bifurcated member whereby the latter may be swung into an inoperative position once downward pressure is applied to the cover plates by the operator.

The above and other objects, features and advantages of the present invention will become more readily apparent from the following description, reference being made to the accompanying drawing in which.

Figure 2:
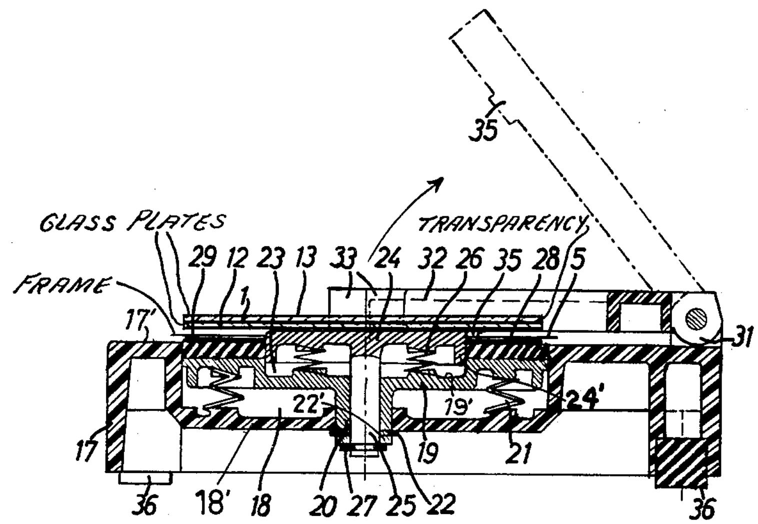
FIG. 2 is a cross-sectional view taken along the line II—II of FIG. 1.
Figure 1:
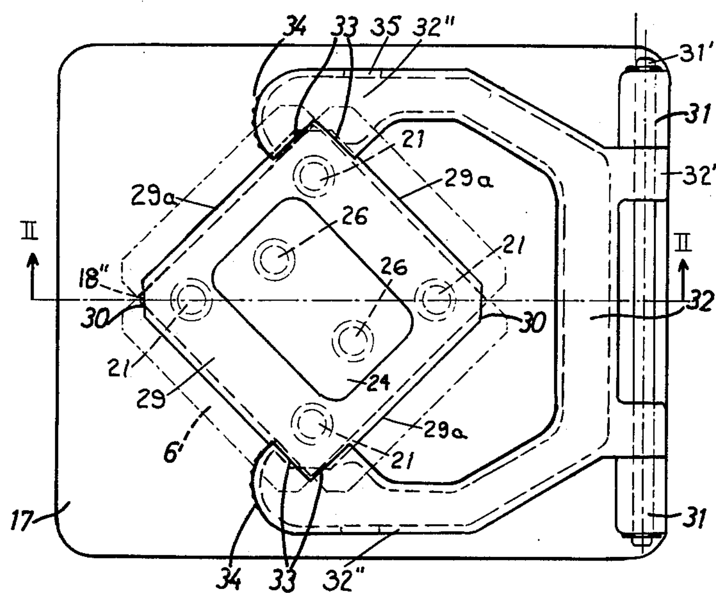
FIG. 1 is a plan view of an apparatus for mounting a transparency according to the invention.
Figure 3:
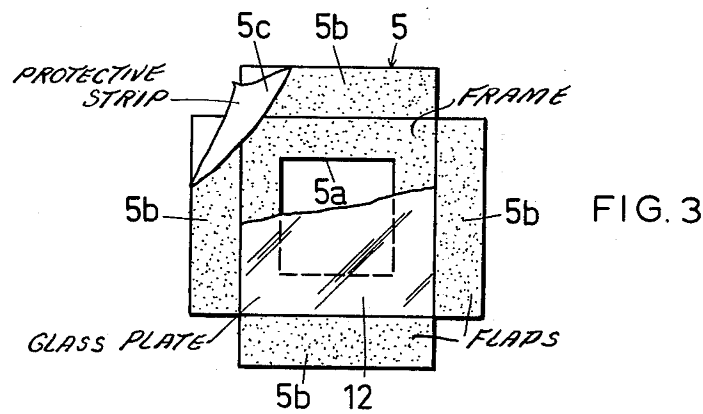
FIG. 3 is a diagrammatic plan view showing the first cover plate in place according to the invention.
Figure 4:
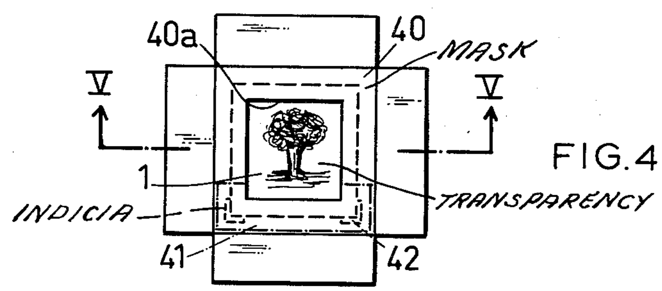
FIG. 4 is a view similar to FIG. 3 illustrating a later stage in the method.
Figure 5:
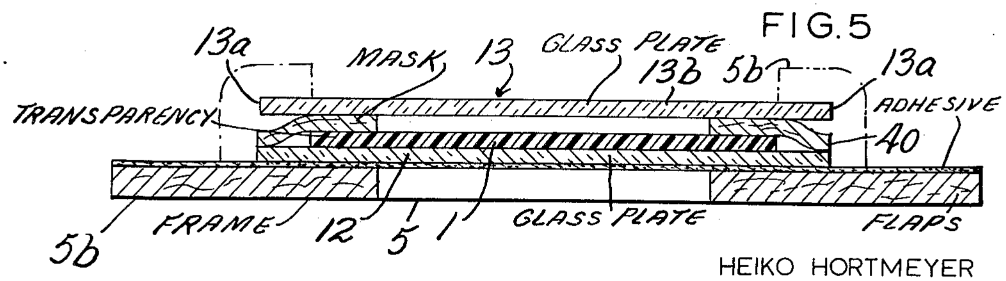
FIG. 5 is a cross-sectional view taken generally along the line V—V of FIG. 4.

Referring first to FIGS. 3–5 for a more detailed explanation of the method according to the invention, it may be pointed out that initially the frame 5 with its central aperture *5a*, which is to be aligned with the desired field of the transparency, rests upon a support plate (to be described subsequently) and is formed with flaps *5b* along its generally rectangular edges. The frame 5 is disposed with its adhesive surface, from which part of the protective strip *5c* is shown to have been removed, directly upwardly. The first glass plate 12 is shown to be overlying this adhesive surface although, when the device of FIGS. 1 and 2 is employed, it actually comes into contact with the frame 5 only after the mask, transparency and cover plate have been disposed thereon. In FIG. 4 we show the mask 40 whose adhesive side overlies the glass plate 12 and which carries the transparency 1. Mask 40 also originally is provided with a strippable flexible protective sheet which overlies the pressure-sensitive adhesive, whose outline is shown by the dot-dash lines 41 and which has been removed prior to the disposition of the mask on the plate 12. As may be seen in FIG. 4, the transparency 1 is aligned with the indicia 42 carried by the mask, these indicia being incisions in the mask or similarly functioning markings. Since not all of the adhesive 41 is covered by the transparency 1, the remainder serves to secure the mask 40 to cover plate 12. The mask 40 is provided with an aperture *40a* aligned with the aperture *5a* of frame 5.

From FIG. 5 it may be seen that the flaps *5b* can, after the second glass or cover plate 13 is disposed upon the mask 40 with its transparency 1, be folded upwardly to engage the lateral edges *13a* of the upper plate 13 and, if desired, to overlie the top surface *13b* of this plate. It should be understood that the frame 5 and the mask 40 should be opaque in order to clearly define the field of view of transparency 1. The several method steps will become more clearly apparent from the following description of the apparatus for mounting the transparencies.

In FIGS. 1 and 2 we show a base 17, which may be cast from a synthetic resin, formed with a recess 18 of generally rectangular configuration. This recess in the upper surface of the base 17 is somewhat larger than the finished slide and, consequently, the glass plates 12 and 13 to be employed. Within this recess we provide a support plate 19 whose edges closely conform with those of the recess and which is formed with a hollow stem or guide sleeve 20 slidably received in a central bore in the floor 18' of the recess 18. Between the support 19 and this floor there are provided relatively strong resilient means (e.g. the four springs 21 at the corners of the plate), which urge the plate upwardly. The plate is thus displaceable against the force of these springs in a direction perpendicular to itself. A ring 22, such as a circlip, is received in a circumferential groove 22' in the sleeve 20 and limits the displacement of the latter by the springs 21.

The plate 19 is provided with a further recess 23 within which a generally flat plunger member 24 is displaceable up and down thus in the direction of displacement of the plate 19. This plunger member, which is so dimensioned as to pass through the aperture *5a* of the frame 5 resting upon the support plate 19, has a receiving surface upon which the cover plates 12, 13 and the mask 40 with its transparency 1 may be disposed. The plunger member is provided with a central guide stud 25 which is axially displaceable within the sleeve 20. The stud 25 has a ring 27 limiting its upward displacement by relatively weak resilient means in the form of a pair of springs 26 which bear upon the lower surface of member 24 and the floor 19' of recess 23.

The receiving surface of support plate 19 is formed by a relatively thin, flexible and resilient layer 29 (e.g. of rubber) whose edges *29a* project beyond the edges of recess 18 and overlie the upper surface 17' of the base 17. The corners of this layer 29 are truncated to form edges 30 which extend perpendicularly to the respective diagonals of the slide. Thus, the corners 18'' of the generally rectangular recess 18 project slightly beyond these truncated edges 30. The layer 29 lies upon a resilient cushion 28 of foam rubber, foam plastic or the like which prevents breakage of the glass plates.

The recess 18 is so disposed in the base 17 that one of its diagonals lies generally parallel to a longitudinal edge of base 17 while the other is perpendicular thereto. A bifurcated yoke 32 is pivoted for swinging movement about an axis parallel to this edge and perpendicular to the longitudinal dimension of the base. To this end the base 17 is provided with two eyes 31 through which a hinge pin 31' passes to engage complementary eyes 32' on the yoke 32. This yoke serves as a guide means for the glass plates 12, 13 and is provided at the ends of its arms 32'' with a pair of confronting jaws having diagonally opposite, angular cutouts complementary to the diagonally opposite corners of the glass plates. The cutouts form abutments 33 which engage adjacent edges of the glass plates and may be seen in FIG. 1. The extremities 32'' of yoke 32 are also formed with milled rills which permit the operator to spread the arms 32' slightly in order to accommodate even slightly off-size cover glasses. It should be noted, however, that the projecting marginal portions *29a* of the flexible layer 29 extend beyond the cover glasses and overlie the corresponding edges of recess 18 in spite of the fact that these may originally be spaced considerably from the edges of guide plate 19. The yoke 32 is also formed with projections 35 which rest upon the upper surface 17' of base 17 in order to hold the yoke in its operative position (solid lines in FIG. 2). At the four corners of the apparatus we provide rubber feet 36 to avoid marring any table top upon which the device is positioned.

An operator, after stripping the protective sheet from the pressure-sensitive adhesive of the frame 5, disposes the latter upon the flexible layer 29 with its flaps *5b* extending beyond the edges of the recess 18 and its adhesive side upwardly. The first glass plate 12 is then positioned upon the plunger member 24 whose surface is located slightly above the adhesive surface of mask 5. Prior to inserting the first glass plate, the yoke 32 is swung into its solid-line position (FIGS. 1 and 2) whereupon the glass plate can be inserted between the adjacent edges 33 of the angular cutouts. This glass plate is thus positively guided with respect to the frame 5 which is positioned by its aperture *5a*, the latter being penetrated by the rectangular plunger 24. The transparency 1 is then mounted upon its mask 40 as previously described and placed upon the lower plate 12 with diagonally opposite corners of the mask guided by the surfaces 33. The upper cover plate 13 is then disposed in a similar manner upon the mask and, by pushing down with his hand on the upper cover plate, downward pressure is applied by the operator to the resulting pack while the yoke 32 is raised to its dot-dash or inoperative position to remove it from the working area. The downward pressure successively causes the adhesive surface of the mask 40 to engage the lower plate 12 and the adhesive surface of the frame 5 to engage the outer surface of this glass plate. Since the two springs 26 apply a lesser total force to the plunger 24 than is applied by the four springs 21 to the plate 19, a lost-motion connection is formed between members 24 and 19 whereby the plunger 24 is displaced prior to movement of the plate. Thus, the frame 5 is applied to the transparent plate 12 before the abutting surfaces 19' and 24' of the plate and member interengage. Subsequently, continued pressure by the operator displaces the guide plate 19 downwardly so that the flaps *5b* of the frame are folded around the edges of the plates 12, 13 via the resilient layer 29. The operator can then manually smooth these flaps onto the upper surface of plate 13 (see FIG. 5). The finished slide can then be removed and the operation repeated, the plunger 24 and the plate 19 being restored to their initial positions by the respective springs.

The invention described is believed to admit of many modifications within the ability of persons skilled in the art, all such modifications being considered within the spirit and scope of the appended claims.

We claim:

1. Apparatus for mounting transparencies, comprising a base formed with a main recess, a support plate having a generally planar support surface adapted to receive a flexible frame of sheet material whose flaps project beyond the edges of said recess, said plate being formed with a central auxiliary recess and mounted in said main recess for displacement in a direction generally transverse to said surface from an initial position wherein said surface lies above said edges of said main recess to a final position wherein said surface lies below said edges, a plunger member adapter to extend through said frame and mounted in said auxiliary recess for displacement relatively to said plate in said direction between a first position wherein the top of said member lies above said surface and a second position wherein said member lies below said surface, relatively weak resilient means resisting a lowering of said plunger member in said auxiliary recess, relatively strong resilient means resisting a lowering of said plate in said main recess, and guide means for positioning successively a first transparent cover plate, a transparency and a second transparent cover plate on said receiving member, whereby depression of said cover plates, said member and said support plate against the force of said resilient means successively brings said first cover plate into engagement with said frame and folds said flaps along the edges of said cover plates.

2. Apparatus according to claim 1 wherein said plunger member is provided with a depending central stud, said vase having a central bore, said support plate being provided with a depending guide sleeve for said stud slidably received in said bore.

3. Apparatus according to claim 1 wherein said support surface is formed by a flexible layer on said plate, said layer having marginal portions normally overlying said edges of said main recess.

4. Apparatus according to claim 3 wherein said layer is of generally rectangular configuration and has truncated corners whose edges extend generally transversely to the diagonals of said layer.

5. Apparatus according to claim 3 wherein said support plate is provided with a resilient cushion upon which said layer is disposed, said cushion being wholly received within said main recess.

6. Apparatus according to claim 5 wherein said cushion is composed of a material selected from the group which consists of foam rubber and foam plastic.

7. Apparatus according to claim 1 wherein said guide means comprises a bifurcated yoke pivoted to said base for swinging into and out of an operative position just above said surface, said yoke being formed with confronting abutments engageable with opposite edges of said cover plates for positioning same relatively to said frame.

8. Apparatus according to claim 7 wherein said abutments are angular by recessed jaws adapted to engage adjacent edges of said plates at opposite corners thereof.

9. Apparatus according to claim 8 wherein said recess is of generally rectangular configuration, said yoke being pivoted to said base for rotation about an axis generally parallel to a diagonal of said recess.

10. Apparatus according to claim 7 wherein said yoke is provided with projections adapted to hold said yoke on said base out of engagement with said plate in said operative position.

References Cited by the Examiner

UNITED STATES PATENTS

| | | | |
|---|---|---|---|
| 2,164,655 | 7/39 | Kleerup | 156—493 |
| 2,302,561 | 11/42 | Libby | 156—514 |
| 2,338,189 | 1/44 | Libby | 156—108 |
| 2,527,765 | 10/50 | Roehrl | 40—159 |
| 2,639,254 | 5/53 | Smith | 156—108 |
| 2,666,543 | 1/54 | Standish | 156—514 |
| 2,861,368 | 11/58 | Rosenberg | 40—158 |

EARL M. BERGERT, *Primary Examiner.*

EDWARD V. BENHAM, *Examiner.*